(12) United States Patent
Rousu et al.

(10) Patent No.: US 6,943,739 B1
(45) Date of Patent: Sep. 13, 2005

(54) METHOD AND APPARATUS FOR TESTING RF MODULES

(75) Inventors: Seppo Rousu, Oulu (FI); Kari Moilanen, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/805,930

(22) Filed: Mar. 22, 2004

(51) Int. Cl.[7] .......................... H01Q 1/24; G01R 29/10
(52) U.S. Cl. ...................... 343/702; 343/703
(58) Field of Search ................ 343/702, 703, 343/846; 455/115, 129, 67.4; 324/754

(56) References Cited

U.S. PATENT DOCUMENTS

| | | | |
|---|---|---|---|
| 5,832,372 A * | 11/1998 | Clelland et al. | 455/115.2 |
| 6,271,465 B1 | 8/2001 | Lacey | 174/35 R |
| 6,459,287 B1 * | 10/2002 | Nightingale et al. | 324/754 |
| 6,469,673 B2 | 10/2002 | Kaiponen | 343/703 |
| 6,486,835 B1 | 11/2002 | Wakeham | 343/702 |
| 2001/0023176 A1 * | 9/2001 | Talvitie et al. | 455/67.4 |
| 2002/0000946 A1 | 1/2002 | Portin | 343/795 |
| 2004/0175978 A1 * | 9/2004 | Mugiuda et al. | 439/188 |

* cited by examiner

Primary Examiner—Hoang V. Nguyen
(74) Attorney, Agent, or Firm—Harrington & Smith, LLP

(57) ABSTRACT

A device that has an antenna and an internal RF circuit is connected by an electrical conductor that has a first portion coupled to the RF circuit and an opposed, flexibly resilient second portion. The second portion defines a contact point and a testing point. The contact point is normally electrically coupled to the antenna by a bias in the second portion. When a biasing force such as a RF testing probe exerts force on the testing point through an aperture of a device housing, the normal bias of the second portion is overcome and contact is temporarily interrupted between the antenna and the contact point. The RF probe is placed in electrical contact with the RF circuit by contact with the testing point, which may be directly when a cover over the aperture is removable, or via a conductive pathway imposed through a flexible membrane that is fixed to the housing as a cover over the aperture.

19 Claims, 6 Drawing Sheets

METHOD AND APPARATUS FOR TESTING RF MODULES

TECHNICAL FIELD

This invention relates generally to the field of radio frequency (RF) testing and, more specifically, relates to the testing of RF circuits located in wireless devices in a manner that does not require removal of the module housing or antenna.

BACKGROUND

There has been a great increase in the development of RF components, especially in mobile stations and similar such devices. The advancement of mobile stations has prompted the increase in the number of RF components that require production line and service testing of RF signals for conformance to government and industry standards. The testing and characterization of these RF signals has been important to quality control in the production and repair of mobile terminals.

The complexity of wireless devices is increasing, and as a result, this requires more testing time for the individual RF components. Costs are typically determined by such factors as labor and the number of test devices needed. As in any mass production undertaking, optimizing these cost factors is an important consideration.

For reasons of expediency of both production and servicing it is optimal to test RF signals from RF components without dis-assembling the host wireless device. Also, it is preferable to conduct RF testing without a connected antenna in order to measure RF output power accurately. In the testing of receiver circuits, a connected antenna can receive interference signals, thus preventing the accurate testing of the receiver circuits. It is preferred to conduct RF testing without a connected antenna in order to limit the undesirable transmission of RF energy from the antenna. This undesirable transmission can interfere with surrounding electrical equipment. There have been methods provided in the prior art for testing RF devices, which, when used in servicing a mobile station, generally require the removal of the antenna, housing, or other components. In some types of mobile stations, the antenna must first be removed to allow for RF testing of the antenna connection. In addition, the mobile station must usually be dis-assembled into various parts.

In the manufacture of mobile stations, RF testing is usually first conducted prior to complete assembly. Such testing is usually followed by final assembly and a further RF test of the fully assembled device. This method is repetitious and inefficient, and further exposes the device and its internal components to damage that could frustrate other quality controls.

In a service center it is possible to install new software on a malfunctioning mobile station with little or no disassembly of the device. Afterwards, the mobile station typically requires testing prior to being returned to the customer. It would be advantageous if the mobile station could be RF tested in the service center without dis-assembly to identify and isolate malfunctioning component(s).

Sometimes an antenna must be removed in a service center, exposing it to damage. Some wireless devices contain an aperture for RF testing. However, these apertures can expose sensitive internal components to damaging environmental factors such as moisture or dust during normal use by the customer. Such contamination may also enter if a mobile station's housing is breached during testing that requires dis-assembly. One example of an aperture is in U.S. Pat. No. 6,469,673, which describes an aperture in a planar radiator element of a mobile station for testing of RF signals. Apart from the advantages it offers, this aperture appears to provide for the above-mentioned environmental exposure.

Some mobile stations protect against environmental contaminants such as water and dust by including more occlusive seals, some of which are water resistant. Minor additional expense associated with these more occlusive seals is justified by the increased longevity of the internal components, which remain better protected. However, such seals also make routine maintenance more difficult and raise maintenance expenses.

Some mobile stations include a specific RF connector on the printed wire board that is dedicated to RF testing only, and provides no direct advantage to the customer. It would be useful to remove this kind of connector, as it adds to the cost and the required printed wire board area.

What is needed in the art is an apparatus and method for testing RF components that are internal to a wireless device without requiring the device be dis-assembled, and/or without leaving the internal components exposed to environmental contaminants such as dust or water during normal use.

SUMMARY

The foregoing and other problems are overcome, and other advantages are realized, in accordance with the presently preferred embodiments of these teachings. In accordance with one aspect of the present invention is a device for transmitting wireless signals. The device includes a housing that defines an aperture, an RF circuit and an electrical conductor each disposed within the housing, an antenna, and a cover over the aperture. The electrical conductor, preferably a spring metal, defines a first portion and an opposed movable second portion. The first portion is coupled to the RF circuit, preferably by a fixed connection such as a solder, ultrasonic bond, conductive adhesive, and the like. The second portion defines an antenna contact point and a testing point that are spaced from one another. The testing point is aligned with the aperture in the housing, and the second portion of the conductor is normally biased to couple to the antenna through the contact point. Preferably, the contact point directly contacts the antenna, though intermediary components may be disposed without departing from the broader aspects of the invention. Most preferably, conductive coupling between the contact point and the antenna is maintained only by the bias of the second portion of the conductor.

The cover over the aperture may be removable, such as a plug or adhesive tape. But preferably, the cover is fixedly attached to the housing and includes a flexibly resilient membrane disposed directly over the aperture. The membrane preferably includes a conductive portion through it. When the RF testing point of the conductor is depressed, such as might be done by a probe through the aperture (for the removable cover) or by depressing the membrane, the second portion of the conductor moves so that electrical contact between the contact point and the antenna is broken. The probe is coupled to the RF circuit through the testing point of the conductor, so the internal components of the device may be tested without dis-assembling the device housing. Other alternative embodiments are disclosed in the detailed description section below.

In accordance with a yet still further aspect of the invention, there is provided a method to temporarily disconnect an antenna that is fixed to a wireless device, from circuitry that is internal to the wireless device. The method includes locating a flexibly resilient convex membrane along an outer surface of a wireless device housing, and depressing the flexibly resilient convex membrane with an electrical testing probe to disconnect an antenna of the device from the internal circuitry. Preferably, the membrane includes a conductive pathway from exterior of the device to interior, via the aperture over which the membrane is located, and depressing the membrane deflects it from a convex to a concave shape. Once the antenna is disconnected, an electrical signal is received at the probe from the internal circuitry. The testing probe is then removed from the membrane, which is released from its concave shape and returns to its convex shape.

In accordance with another method to temporarily disconnect an antenna fixed to a wireless device from circuitry internal to the wireless device, a removable cover is located along an outer surface of a wireless device housing and removed to expose an aperture through the housing. An electrical testing probe is inserted into the aperture far enough to depressing a portion of a flexible electrical conductor, thereby disconnecting an antenna of the device from the internal circuitry. An electrical signal from the internal circuitry is received at the testing probe, the testing probe is removed from the aperture, and a cover is replaced over the aperture, preferably the original cover.

For either method, two probes may be used on one or two different embodiments of the invention. One probe is used as described above, and reads out (or inputs) as signal from (or to) the RF circuit. The other probe disconnects an antenna from ground, and need not be electrically coupled to the device components. Preferably, this other probe is connected to printed wire board ground to enable RF testing.

Furthermore, other types of probes can also provide for the disconnection of the antenna in the same manner as was described for the first probe. The RF testing of the internal circuitry/RF circuit can involve RF tuning of the device. Alternatively, the first probe can contain two or more contacts, wherein one is used for RF testing and one is used for RF grounding which can remove the need for a second RF probe. RF testing may include RF tuning.

The invention can be utilized in both production and service centers. Through the invention, testing can be done without significant disassembly of the device. In addition, the use of dedicated RF test connectors can be avoided on the printed wire board, resulting in saved space on the printed wire board, which reduces costs.

An advantage of the current invention is that the removal of parts is not necessary and thus dramatically decreases the potential for damage (e.g., to the antenna radiator). Yet another advantage of the current invention is that seals and membranes do not have to be removed (in some embodiments), and in fact, the mobile station may be tested while remaining completely closed. This is advantageous because every time a mobile terminal is opened its capability to tolerate environmental damage is generally reduced. One example of a prior art antenna feed structure that can be used with the current invention is in U.S. Patent Application No. 2002/0000946.

An alternative use for the current invention is in a mobile station vehicle kit that mounts a mobile station within a vehicle. Such vehicle kits generally connect the device to external power and sometimes to an external antenna to extend range and increase signal strength. The vehicle kit can readily couple an external antenna to a mobile device that incorporates the present invention, just as an RF probe can de-couple the mobile device's antenna and couple to its internal RF circuitry. Such and arrangement may result in higher current consumption and thus decreased standby and talk time, but vehicle kits typically provide power to the mobile device from the vehicle rather than the mobile's battery, offsetting that disadvantage.

The invention can be used also for DC (direct current) and digital signal applications. In general, the invention can be used with various types of equipment that operate on input and output signals, such as, RF, DC, data and digital signals. This can be done without providing an open aperture in certain embodiments.

In high-frequency technology the transmission line between the feeding source and the circuit that feeds the feeding source is an important consideration in RF testing. The transmission line losses should be relatively small, and the transmission line should not significantly affect the impedance matching. Due to the advantages of the current invention, printed wire board RF connectors are not needed and thus additional transmission line losses are avoided. As will be evident, the present invention facilitates impedance matching to a great degree.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION

Figure 1:
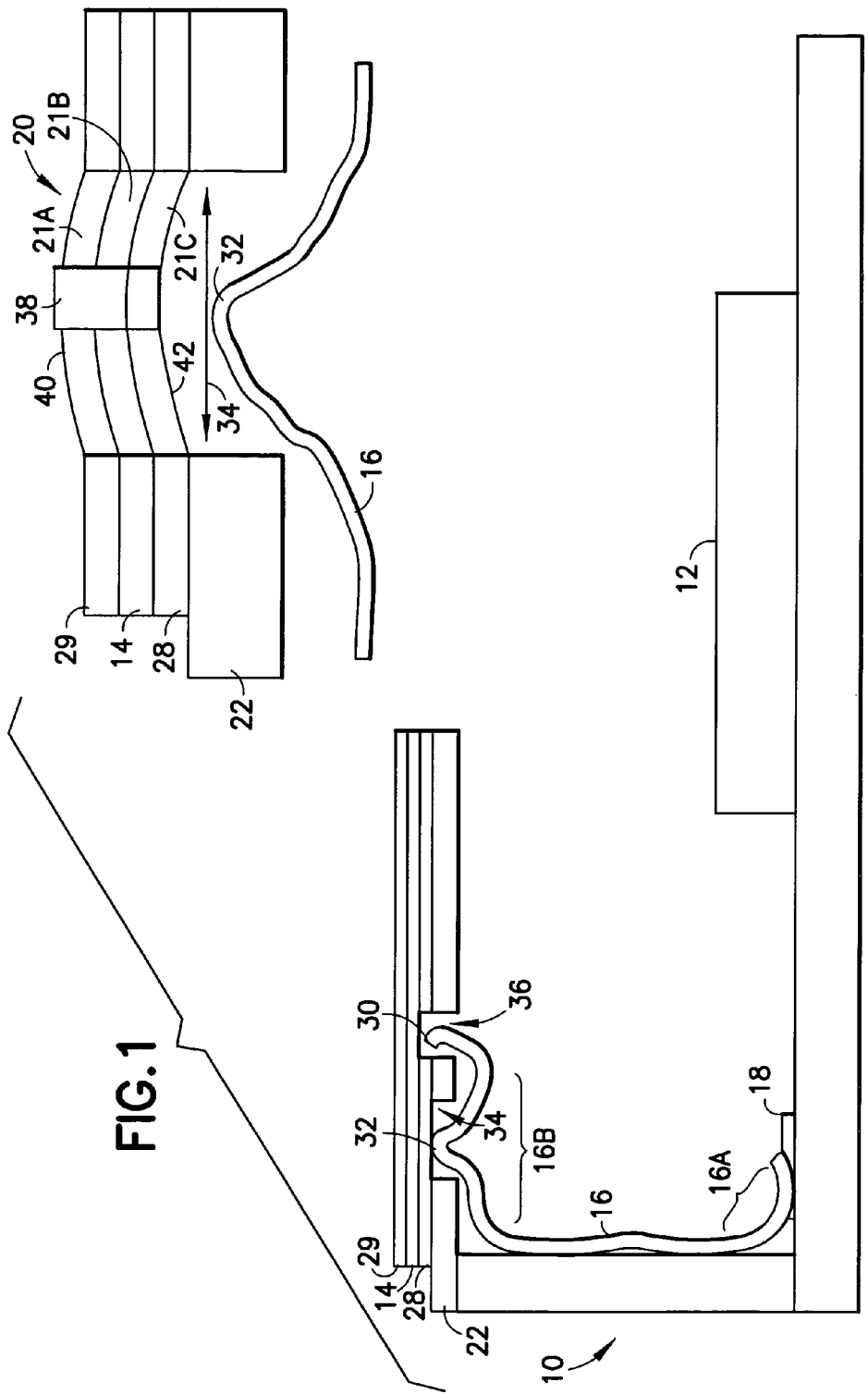
FIG. 1 is a sectional view of a wireless device employing a preferred embodiment of the present invention.

FIG. 1 is a sectional view of a portion of a wireless device 10, such as a mobile station, a hand-held gaming device, a personal communication device, or any device that contains an RF circuit 12 that feeds an antenna. Often, the RF circuit 12 is a separate component, though it may be only part of the entire circuitry disposed in a printed wiring board. FIG. 1 discloses the components located in the wireless device 10 that provide for a method and apparatus for disconnecting an antenna to provide for RF testing. The wireless device 10 contains an RF circuit 12 available for RF testing. The RF circuit 12 is electrically connected to an antenna radiator 14 via an electrically conductive path. The electrically conductive path comprises an electrical conductor such as the depicted antenna spring member 16. The spring member 16 has a first portion 16A that is coupled to the RF circuit 12 such as through an antenna pad 18, and a second portion 16B that defines a contact point 30 and a testing point 32. The second portion 16B of the spring member 16 is normally biased so that the contact point 30 is normally in biased contact with the antenna radiator 14.

The antenna radiator 14 is made of any suitable material, such as a copper foil, copper laminate, or other materials known in the art. The antenna radiator 14 may also be a Midi antenna radiator. Midi is a manufacturing technology that provides a plastic material that is plated with a conducting material. Preferably, as with midi but not exclusive thereto, a lower insulator layer 28 is disposed between the antenna radiator 14 and the housing 22, and a protective outer layer 29 overlies a surface of the antenna opposite the housing 22, preferably the entire surface opposite the housing.

As illustrated in the embodiment of FIG. 1, a cover 20 includes a membrane 21 that is disposed over a first aperture 34 defined by a housing 22 of the wireless device 10, preferably forming a water resistant seal over the first aperture 34. The testing point 32 of the spring member 16 is also aligned with the first aperture 34. The antenna radiator 14 is preferably a planar antenna as shown in FIG. 1 or a rod-type antenna (not shown). The antenna spring member 16 is detachably coupled to the antenna at the contact point 30 to the antenna 14 due to the bias of the second portion 16B of the spring member 16. Regardless of type, where the antenna 14 overlies the first housing aperture 34, the antenna 14 also defines an aperture so as not to completely obstruct the first housing aperture 34. Where present, the lower insulating layer 28 and the protective outer layer 29 also define a similar aperture.

The cover 20 is preferably made from a plurality of resiliently flexible layers 21A, 211B, 21C, such as depicted in the expanded view of FIG. 1, though a single layer of sufficiently pliable and resilient material may be employed. At rest, the membrane 21 preferably defines a concave shape protruding from an exterior surface of the housing 22, and is flexibly resilient so that it may be depressed by an external biasing force into a concave shape, as in FIG. 2, and return to the illustrated convex shape when a biasing force is removed. In this embodiment, the cover 20 is fixedly coupled to the housing 22. Fixedly coupled in that context includes coupled so that the cover 20 is not normally removed from the housing 22, and includes coupled via resilient plastic retaining clips affixed to a frame about the membrane 21, a pressure fit, ultrasonic or heat welding, and the like. That the cover 20 may be non-destructively removed from the housing 22 does not render it coupled to the housing 22 in a non-fixed manner.

Disposed within the membrane 21 is a conductive pathway 38, such as a metal body defining a generally cylindrical shape, that penetrates between a first or external surface 40 of the membrane 21 and an opposing second or interior surface 42 of that membrane. The conductive pathway 38 is insulated, preferably by the membrane 21 itself, from contact with the antenna 14. For example, the first aperture 34 measures about 2 mm in diameter, the membrane measures at least 2 mm in diameter, and the conductive pathway is centered over the aperture and measures only about 1 mm in diameter so that it does not contact at any point the antenna 14 (which defines an aperture of at least 2 mm to match that of the housing 22).

Again with reference to FIG. 1, the housing 22 further defines a second aperture 36. The contact point 30 of the spring member 16 is biased to normally contact the antenna 14 through the second aperture 36. A corresponding aperture through any existing insulating layer 34 may be necessary to effect this electrical connection.

Preferably, a planar antenna 14 is used as depicted in FIG. 1. However, the planar antenna 14 may be disposed within the housing 22, or a rod antenna may be used with or without a planar conductive plate to enable the present invention to selectively de-couple the antenna from internal circuitry. In an embodiment where the rod-type antenna is used, (not shown), what is illustrated as the antenna radiator 14 may instead be an antenna conduction layer that does not serve as an antenna.

Operation of the apparatus of the present invention will now be described. An at rest position is illustrated at FIG. 1, and represents a mobile station or other wireless device 10 as used under normal conditions by a retail user. The membrane 21 defines a convex shape that protrudes slightly from the adjacent exterior surface of the device 10. A minimal gap or space is preferably defined between the conductive pathway 38 and the testing point 32, as illustrated in the expanded portion of FIG. 1. Contact between them may cause additional power drain in isolated instances, but will otherwise not frustrate the present invention. The contact point 30 of the spring member remains in contact with the antenna 14 through the second aperture 36 defined by the housing 22 due to the bias of the second portion 16B of the spring member 16. Preferably, that bias is the only means by which the second portion 16B contacts the antenna 14.

Figure 2:
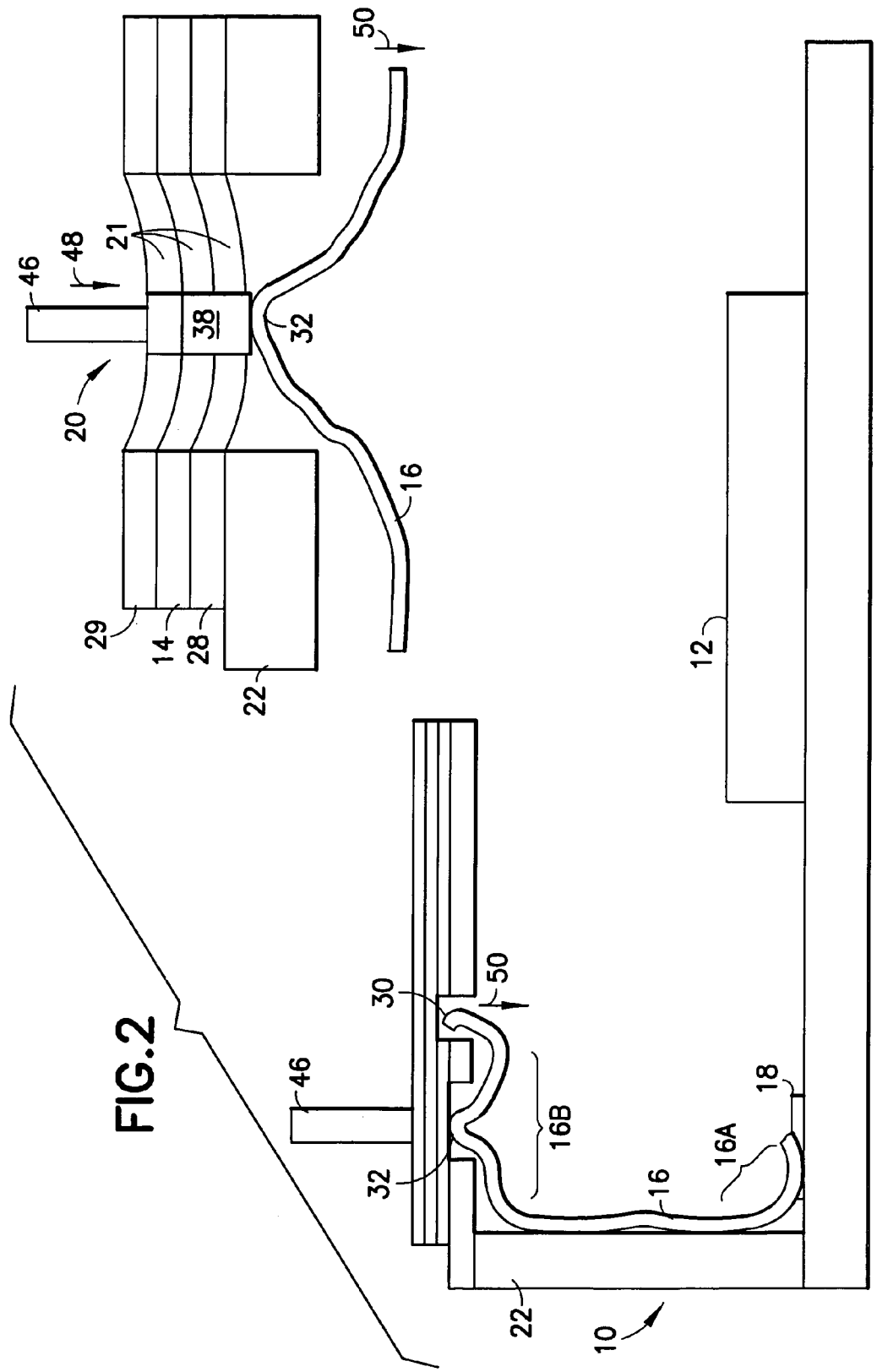
FIG. 2 is similar to FIG. 1 but showing operation of the wireless device in a testing mode using a RF testing probe.

FIG. 2 depicts the apparatus of FIG. 1 but with a biasing force such as a RF test probe 46 pressed against the cover 20. Two arrows 48, 50, in FIG. 2 indicate movement of components, at least some of which is simultaneous. The RF test probe 46 is aligned with the conductive pathway 38. As the RF test probe 46 moves (first arrow 48) to depress the conductive pathway 38 and drive the membrane 21 to a concave geometry, any gap between the testing point 32 and the conductive pathway 38 is eliminated. Following elimination of that gap, movement thereafter described for FIG. 2 is simultaneous. The second portion 16B of the spring member 16 is driven (second arrow 50) away from the housing 22, or at least away from that portion of the housing that defines the first aperture 34. This movement (second arrow 50) of the entire second portion drives the contact point 30 away from the antenna 14, breaking electrical contact therewith as an electrical contact is established between the RF test probe 46 and the RF circuit 12 through the spring member 16.

Due to the desire to define a sufficiently large space between the contact point 30 and the antenna 14 when in the test position of FIG. 2, without having a cover 20 that protrudes excessively from the adjacent exterior surface of the device 10 when not in the test position (as in FIG. 1), it is preferable to dispose the contact point 30 nearer an end of the spring member 16 and the testing point 32 between the contact point and the first portion 16A. This enables a small deflection at the testing point 32 to effect a larger movement at the contact point 30 for the embodiment of FIGS. 1–2. This also enables the antenna to contact a terminal end (the contact point 30) of the contactor 16 when in the normal, non-testing mode of operation. This provides a more positive contact than a protruding 'stub' located apart from an end of the conductor 16. Such a stub is depicted as the testing point 32 in FIGS. 1–2.

Figure 3:
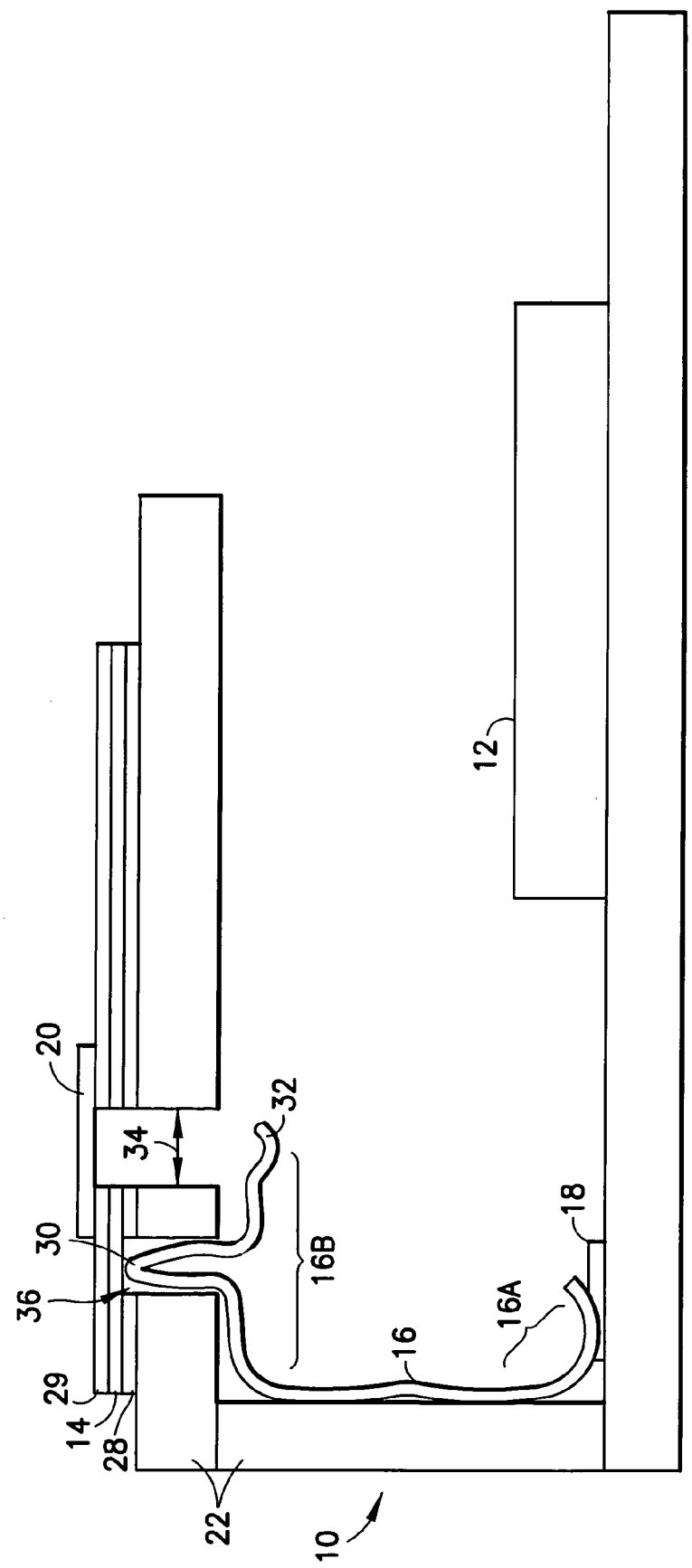
FIG. 3 is a sectional view of a wireless device employing an alternative embodiment of the present invention.
Figure 4:
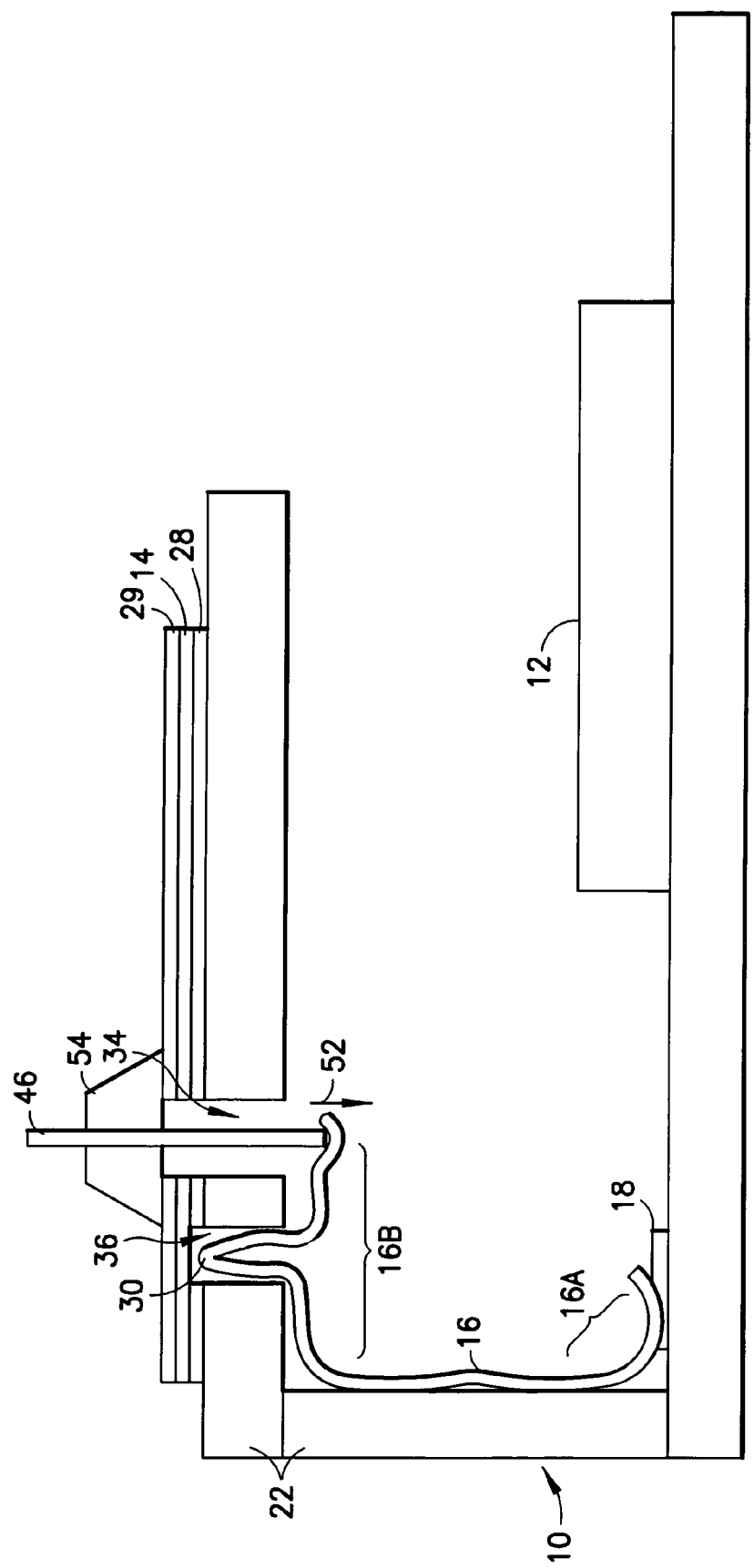
FIG. 4 is similar to FIG. 3 but showing operation of the wireless device in testing mode using a RF testing probe.

An alternative embodiment is described at FIGS. 3–4, of which FIG. 3 depicts components in their normal, at rest orientation, and FIG. 4 depicts components in their orientation when in a testing mode. Like reference numbers indicate like components to the extent not explicitly distinguished. As shown in FIG. 3, a wireless device 10 includes a RF circuit 12, a spring contactor 16 having a first portion 16A coupled to the RF circuit 12 and an opposing flexibly resilient second portion 16B for selectively coupling to an antenna 14. While the housing 22 defines a first 34 and second 36 aperture, their orientation with respect to one another is reversed as compared to the preferred embodiment of FIGS. 1–2. This is because in the embodiment of FIGS. 3–4, the relative positions of the contact point 30 and the testing point 32 are also reversed as compared to the preferred embodiment.

Specifically, the testing point 32 is preferably disposed near an end of the second portion 16B and the contact point 30 is preferably disposed between the testing point 32 and the first portion 16A. The reverse order is possible. The cover 20 is not fixedly attached but is removable attached so that it may re readily removed for testing the RF circuit in accordance with a method of using the apparatus of the alternative embodiment. While the cover 20 of the alternative embodiment remains preferably water resistant and most preferably water proof, it may be a piece of adhesive tape or more durably a removable plug. A special tool not readily available to retail users of a mobile station or other wireless device 10 will inhibit curious users from removing and potentially losing such a plug 20.

In the at rest position when the device is not being subjected to testing, the alternative embodiment of FIG. 3 includes the contact point 30 protruding through the second aperture 36 to contact the antenna 14. The bias of the second portion 16B retains the contact point 30 in such electrical contact. A relatively large gap, preferably greater than a thickness of the housing 22 in the area of the first aperture 34, divides the testing point 32 from the removable cover 20.

In the testing position of the alternative embodiment shown in FIG. 4, the removable cover 20 is removed from obstructing the first aperture 34, and a RF testing probe 46 is inserted therethrough. After first contacting the testing point 32, the probe is inserted further (third arrow 52) to overcome the normal bias of the second portion 16B of the spring member 16. This drives the second portion 16B away from the portion of the housing that defines the second aperture 36, breaking contact between the contact point 30 and the antenna 14. The probe 46 is already in contact with the testing point 32 at the time contact is broken between the contact point 30 and the antenna 14. A collar 54 may be disposed on the probe to ensure it is not inserted an excessive distance into the first aperture 34. Such excessive insertion might alter the normal bias of the second portion 16B such that, upon removal of the probe 46, the contact point 30 will not return to firmly contact the antenna 14. Such a collar 54 should be disposed on the probe 46 such that a distance between a surface of the collar nearest the probe tip exceeds a distance between the testing point 32 and an exterior surface of the wireless device 10 in the immediate vicinity of the first aperture 34. Preferably, a difference between those distances is less than 5 mm. After testing using the alternative embodiment of FIGS. 3–4, the removable cover 20 is replaced.

Figure 5:
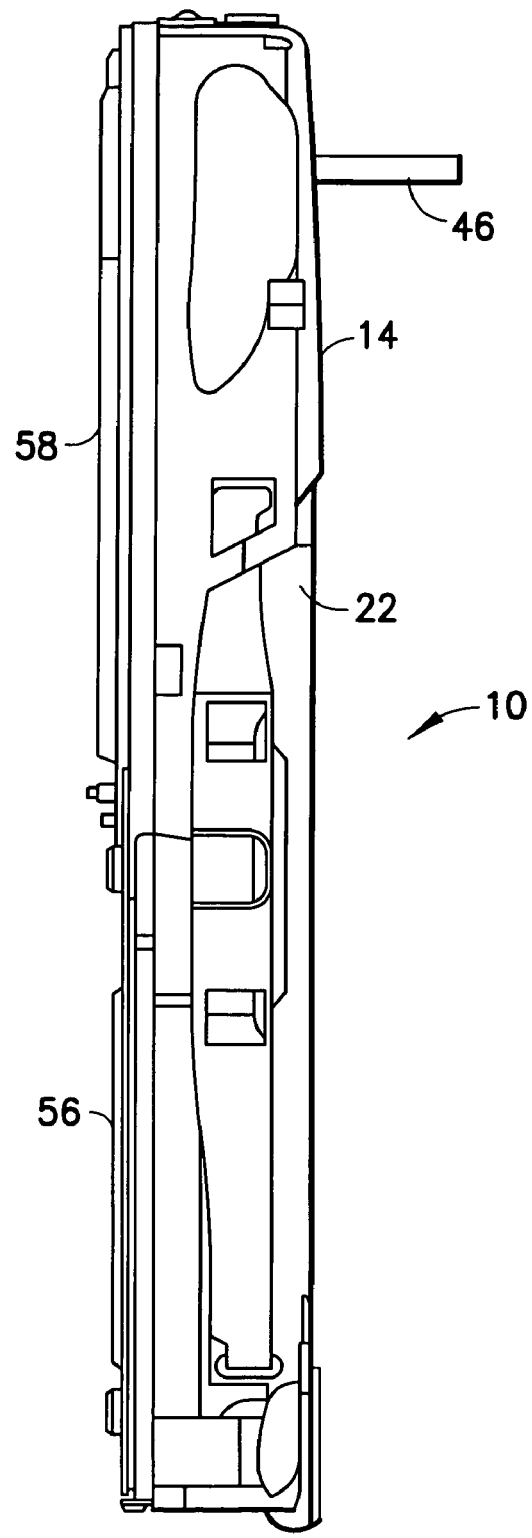
FIG. 5 is a perspective view showing the overall wireless device of FIG. 2 or 4 with the probe or vehicle kit coupled thereto.

FIG. 5 is a side partial cutaway view of the wireless device 10, specifically, a mobile station defining a keypad 56 and a display interface 56 along a surface of the device 10 opposite that through which a test probe 46 may be employed using the present invention. FIG. 5 best illustrates how the present invention may be used for other than RF testing purposes. Rather than a RF testing probe, the device 10 of FIG. 5 may be clipped into a vehicle mount and an exterior antenna coupler may instead couple to the RF circuit 12 in the same manner described above that the RF test probe 46 would couple. In such an application, the preferred embodiment would likely garner better market acceptance, as users would likely not embrace removing and replacing a plug each time they wanted the increased signal strength and call reliability that coupling to a vehicle external antenna generally yields.

In certain instances, it is desirable to use multiple RF testing probes 46. A wireless device 10 may be equipped with more than one copy of the present invention (identical or different embodiments) to enable separate probes or separate probe tips of the same probe 46 to separately contact different points within the RF circuit 12. For example, one RF probe 46 may define two tips, of which one is a ground and the other reads out signals to be analyzed.

Generally, an antenna will have at least two parallel connections to the printed wire board PWB. One connection is for grounding the antenna and the other parallel connection feeds a signal to the antenna. If only one connection is disconnected, RF testing is typically not optimal because of the possibility of the undesirable transmission of RF energy from the parallel (unconnected) antenna connection. Therefore, each separate antenna connection is disconnected by a separate probe or by a single RF testing probe 46. The invention can be implemented so that all of the probes needed for disconnection of all the antenna connections are integrated into the same cylinder or hoop of probes.

Figure 6:
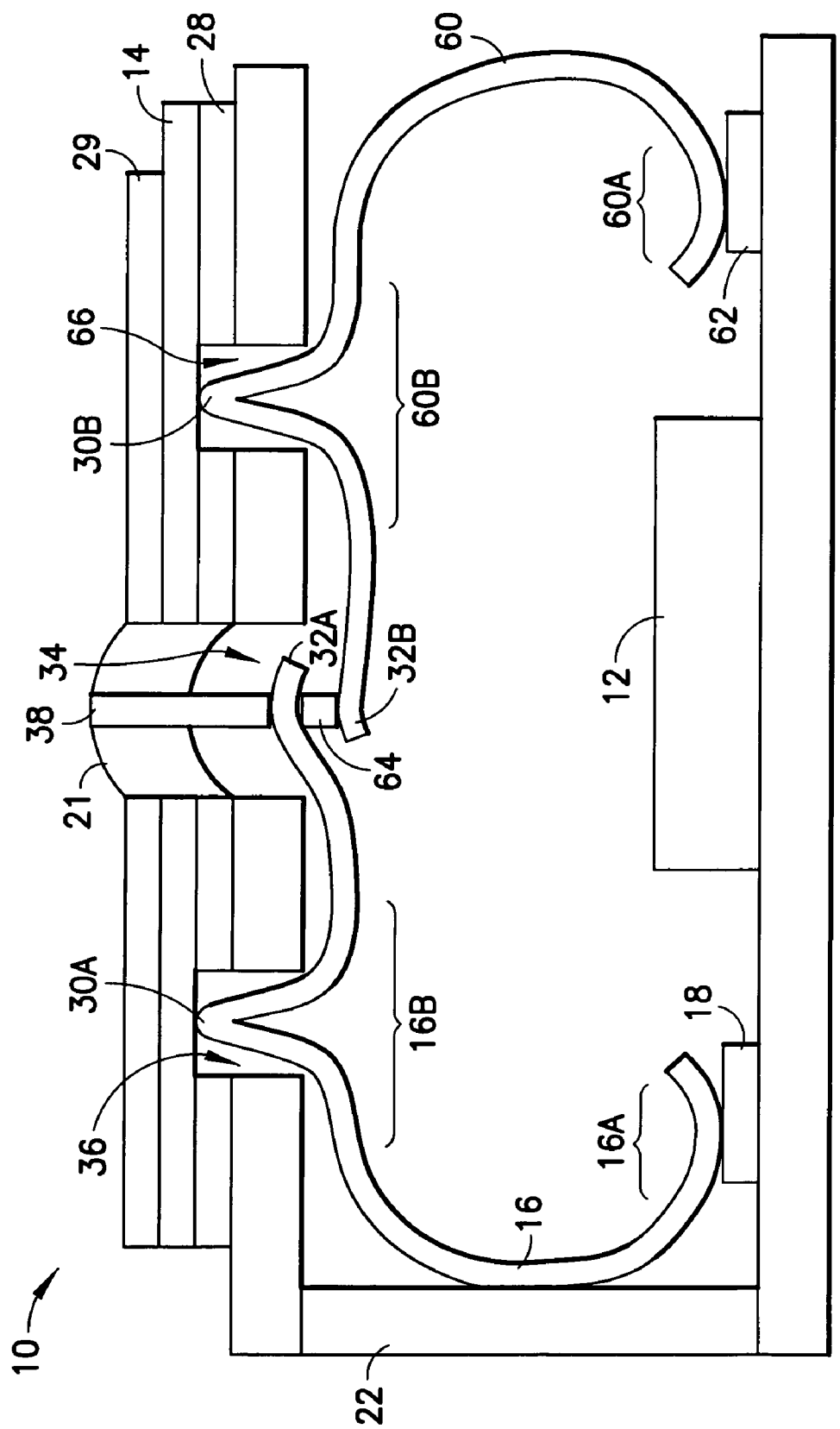
FIG. 6 is a sectional view of a wireless device employing a second alternative embodiment wherein a single probe may disconnect multiple antenna connections simultaneously.

Such an embodiment is depicted at FIG. 6. In summary, this embodiment includes two spring members, one carrying an electrical signal 16 as previously described, and one carrying a common potential, termed the grounding member 60. Both are coupled to separate portions of the antenna 14.

As shown in FIG. 6, the signal member 16 is coupled to an antenna pad 18 at a first portion 16A, and a flexible second portion 16B defines both a contact point 30A that is normally biased to contact one portion of the antenna 14 via a second aperture 36 through the housing 22 and a signal testing point 32A disposed in alignment with a first housing aperture 34. This is similar to that described with reference to FIGS. 3–4. The grounding member 60 similarly defines a first portion 60A that is fixed to a grounding pad 62 and an opposed flexible second portion 60B that defines a ground contact point 30B that is normally biased to contact a grounded portion of the antenna 14 through a third aperture 66 defined by the housing 22. The second portion 60B of the grounding member 60 further defines a ground testing point 32B that is also aligned with the first aperture 34, but separated from the testing point 32A of the signal-carrying member 16 by an electrical insulator 64, preferably a rigid body insulator. The first aperture 34 is extended to penetrate any portions of the insulating layer 28, antenna 14, and protective outer layer 29 that may be present. A cover 20 may be the membrane type as described with reference to FIGS. 1–2, or the removable type as described with reference to FIGS. 3–4. FIG. 6 illustrates the membrane type. The membrane 21 is fixedly coupled to the housing 22, and a conductive pathway 38 passes through it. When the membrane 21 is depressed from its depicted convex shape, the conductor urges the second portion of both the signal carrying member 16 and the grounding member 60A downward (as depicted) as force is transferred through the conductive pathway 38 and the insulator 64. As this occurs, electrical contact between the antenna 14 and the contact point 30A of the signal carrying member 16 is interrupted, as it is between the antenna 14 and the ground contact point 30B of the grounding member 60. As depicted, preferably the testing point 32A of the signal-carrying member 16 is disposed between the membrane 21 or other cover 20 and the ground testing point 32B of the grounding member 60.

In this manner, a single RF testing probe 46 may simultaneously disconnect more than one electrical connector 16, 60 from the antenna 14 while making contact with the underlying RF circuit 12. Ground may be provided to the device 10 through its normal external power receptacle (not shown). That external ground sets the potential at the grounding pad 62, and may also serve as a ground for the RF testing probe in a grounding connection external to the device 10. Since both the RF probe 46 and the device 12 are linked to the same external ground, the end result is the same as if the RF device 46 was itself linked to the grounding pad 62 within the device 10.

Alternatively, a signal-carrying spring member and a grounding spring member, each as in FIGS. 1–2, may be disposed separately and independently de-coupled from the antenna by separate probes at separate membranes. In that instance, the probe de-coupling the grounding member need not be a RF test probe and the associated membrane need not include a conductive portion, as electrical current need not flow from the spring member to that non-RF testing probe. Either of the alternatives of this paragraph may also be used with the embodiment of FIGS. 3–4.

The RF devices of the current invention can involve various signaling types. For example, the signaling types can involve pulsed transmission and pulsed reception, as well as, continuous transmission and continuous reception signaling type RF devices. The disconnected antenna system can be one of a single frequency band antenna, a multi-frequency band antenna, a single mode antenna system and a multi-mode antenna system. The testing can involve the testing of the transmitter or the receiver. The individual antenna types can be Pifa, loop, slot and whip antennas or others known in the art. The shape and length of transmission line conductors may vary.

The current invention as described in the figures thus allows for the production-line and service testing of wireless devices without removing the wireless device housing 22, or any component associated with the antenna spring member 16.

Based on the foregoing description, it can be appreciated that the current invention does not require dedicated printed wiring board (PWB) testing components that are conventionally required to allow for testing. In addition, conventional spring contact pins, known in the trade as pogo pins, are not needed. Unlike other previously used methods, the invention can allow for complete or at least partial assembly of an wireless device that can then have the complete or at least partially assembled wireless device RF tested before it leaves the production facility or, alternatively, have the completely assembled wireless device RF tested when servicing is required without having to remove any of the components of the completely assembled wireless device. These embodiments are advantageous in that they provide a solution that eliminates the requirement for antenna disassembly, or the removal of wireless device components, prior to RF testing, and does so at low cost and low complexity.

The use of the teachings of this invention may also be employed in other than wireless terminals, which may be viewed as a presently preferred, but not limiting application for these teachings. The foregoing description has provided by way of exemplary and non-limiting examples a full and informative description of the best method and apparatus presently contemplated by the inventor(s) for carrying out the invention. However, various modifications and adaptations may become apparent to those skilled in the relevant arts in view of the foregoing description, when read in conjunction with the accompanying drawings and the appended claims. As but for some examples, the use of other similar or equivalent switches may be attempted by those skilled in the art such as discrete transistors coupled with a mechanical relay or solenoid, or any other type of switch that can perform substantially the same function of opening the electrically conductive path. However, all such and similar modifications of the teachings of this invention will still fall within the scope of this invention.

What is claimed is:

1. A device comprising:
    a housing defining a housing aperture;
    a RF circuit disposed within said housing;
    an antenna;
    an electrical conductor disposed within said housing and defining a first portion and an opposed movable second portion, wherein said first portion is coupled to the RF circuit and the second portion defines an antenna contact point and a testing point spaced from one another, said testing point aligned with said housing aperture and said second portion normally biased to couple to said antenna through the contact point; and
    a cover over said housing aperture.

2. The device of claim 1 wherein said cover is removable.

3. The device of claim 1 wherein said cover is fixedly coupled to said housing and defines a flexibly resilient portion disposed over said housing aperture.

4. The device of claim 3 wherein said flexibly resilient portion defines a first planar surface facing said aperture and an opposing second planar surface, said cover further comprising a conductive pathway from said first to said second planar surfaces.

5. The device of claim 1 wherein said antenna comprises a planar antenna disposed outside said housing.

6. The device of claim 5 wherein said planar antenna defines an antenna aperture that is aligned with said housing aperture.

7. The device of claim 6 wherein said housing aperture is a first housing aperture, and said housing further defines a second housing aperture aligned with said antenna contact point.

8. The device of claim 1 wherein said testing point is disposed between said antenna contact point and said electrical conductor first portion.

9. The device of claim 1 wherein said antenna contact point is disposed between said testing point and said electrical conductor first portion.

10. The device of claim 9 wherein said electrical conductor is a signal-carrying conductor, said device further comprising:
    a ground-carrying conductor disposed within said housing and defining a first grounding portion and an opposed movable second grounding portion, wherein said first portion is coupled to a common potential within said device and the second grounding portion defines a grounding test point and an antenna grounding contact point disposed between the grounding test point and the grounding first portion, said grounding testing point aligned with said housing aperture and said second portion normally biased to couple to said antenna through the grounding contact point.

11. The device of claim 10 further comprising an insulating member disposed between said grounding test point and said testing point of said signal-carrying member, wherein said testing point of said signal-carrying member is disposed between said grounding test point and said cover.

12. The device of claim 1 wherein said first portion is fixedly coupled to said RF circuit and said antenna contact point remains coupled to said antenna by said normal bias of said second portion.

13. The device of claim 1 wherein said RF circuit is a radiotelephone transceiver and the device is a mobile terminal.

14. The device of claim 1 wherein the cover is water resistant.

15. A method to temporarily disconnect an antenna fixed to a wireless device from circuitry internal to the wireless device comprising:
- locating a flexibly resilient convex membrane along an outer surface of a wireless device housing; and
- depressing the flexibly resilient convex membrane with an electrical testing probe to disconnect an antenna of the device from the internal circuitry;
- receiving an electrical signal from the internal circuitry to the device at the testing probe; and
- removing the testing probe from the membrane.

16. The method of claim 15 wherein depressing the flexibly resilient convex membrane with an electrical testing probe comprises applying the testing probe to a conductive portion of the membrane.

17. The method of claim 15 executed on a completed wireless device wherein the housing completely envelops the internal circuitry.

18. The method of claim 15 executed on a wireless device under construction wherein the housing does not completely envelop the internal circuitry.

19. A method to temporarily disconnect an antenna fixed to a wireless device from circuitry internal to the wireless device comprising:
- locating a removable cover along an outer surface of a wireless device housing;
- removing said cover to expose an aperture through said housing;
- inserting an electrical testing probe into the aperture to disconnect an antenna of the device from internal circuitry by depressing a portion of a flexible electrical conductor;
- receiving an electrical signal from the circuitry internal to the device at the testing probe; and
- removing the testing probe from the aperture and replacing a cover over said aperture.

* * * * *